United States Patent Office 3,660,443
Patented May 2, 1972

3,660,443
PROCESS FOR THE ALKYLATION OF HALO-
GENATED SILICON AND TIN COMPOUNDS
Jean Boissieras, Lyon, and Bernard Delarue and Marcel
Lefort, Rhone, France, assignors to Rhone-Poulenc
S.A., Paris, France
No Drawing. Filed May 28, 1968, Ser. No. 732,536
Claims priority, application France, May 31, 1967,
108,623
Int. Cl. C07f 7/22, 7/02
U.S. Cl. 260—429.7
10 Claims

ABSTRACT OF THE DISCLOSURE

Silicon and tin derivatives containing halogen directly attached to silicon or tin respectively are alkylated by reaction with an alkyl zinc derivative in a hexaalkylphosphoryltriamide or an N,N-dialkylamide. The alkyl zinc derivative may itself be prepared by reaction of zinc with an alkyl halide in the presence of iodine or with an alkyl iodide in a hexaalkylphosphoryltriamide.

---

The present invention relates to the alkylation of silicon or tin derivatives comprising at least one silicon-halogen bond or at least one tin-halogen bond respectively, more especially of halogenosilanes, organohalogenopolysiloxanes and halogenostannanes. It also concerns a process for the preparation of the halogenoalkyl zinc derivatives employed in this process.

It has already been proposed (see British patent specification No. 601,938) to prepare organosilicon compounds carrying hydrolysable atoms or groups by alkylating silicon tetrachloride or alkyl orthosilicates with an alkyl zinc halide prepared separately or in situ.

It is also known, from Stock et al., [Chem. Ber. 52, 695 (1919)] to prepare mono- and dimethylsilanes from mono- and dichlorosilanes and dimethyl zinc. However, according to Hurd [J. Amer. Chem. Soc. 67, 1545 (1945)], this reaction is not applicable to the methylation of silicon tetrachloride and dimethyldichlorosilane. According to these authors, the alkylation takes place when the chlorosilane and the alkyl halide are contacted in the vapour phase with finely divided zinc. This reaction has the disadvantage of necessitating high temperatures, of the order of 375° C.

The present invention provides a process for the alkylation of a silicon or tin derivative having at least one silicon-halogen or tin-halogen bond respectively, which comprises treating the said derivative with a mixed or symmetrical alkyl zinc derivative in an amide of the formula:

$$O=P\left(N\begin{matrix}R\\R\end{matrix}\right)_3 \quad \text{or} \quad R^1-CO-N\begin{matrix}R\\R\end{matrix}$$

$$\text{I} \qquad\qquad\qquad \text{II}$$

in which R and $R^1$ are lower alkyl radicals, and $R^1$ may also be hydrogen. By "lower alkyl radical" is meant alkyl of from 1 to 4 carbon atoms. The invention is particularly useful for the alkylation of halogenosilanes, organohalogenopolysiloxanes and halogenostannanes. The new process is substantially universal and gives excellent yields. In addition, it makes it possible to employ symmetrical alkyl zinc derivatives with complete safety, because the latter, which are dangerous to handle in the pure state, are particularly stable in the presence of the aforesaid amides.

The preferred amides of the Formulae I and II are hexamethylphosphoryltriamide and N,N-dimethylformamide.

The halogenosilanes which may be alkylated by the new process are the halogenomonosilanes of the formula:

$$R_a{}^2-Si-X_{(4-a)} \qquad \text{III}$$

in which $R^2$ represents a branched or unbranched alkyl radical such as methyl, ethyl, isopropyl, butyl or octyl; an alkenyl radical such as vinyl or allyl; an alkoxy radical such as methoxy, ethoxy, n-propoxy or n-butoxy; a cycloalkyl radical optionally having alkyl chains, such as cyclopropyl, cyclopentyl, methylcyclopentyl or cyclohexyl; an aryl radical optionally substituted by alkyl, such as phenyl, methylphenyl or isopropylphenyl; an aralkyl radical such as benzyl; X represents a halogen atom; and $a$ is 0, 1, 2 or 3. When $a$ is equal to 2 or 3, the radicals $R^2$ may be identical or different. In addition these radicals $R^2$ may comprise substituents which are not capable of reacting under the operating conditions, such as the group —CN.

It is also possible to alkylate by the new process the α,ω-bis-(organohalogenosilyl)alkanes of the formula:

$$R_b{}^2-SiX_{(3-b)}-Y-SiX_{(3-c)}-R_c{}^2 \qquad \text{IV}$$

in which $R^2$ and X are as previously defined, Y represents an alkylene radical, and $b$ and $c$ are each 0, 1 or 2, it being possible for the radicals $R^2$ to be identical or different when $b+c$ is at least equal to 2.

Suitable halogenosilanes of the Formula III include, more particularly, silicon tetrachloride, trimethylchlorosilane, dimethyldichlorosilane, diethyldichlorosilane, methylvinyldichlorosilane, vinyltrichlorosilane, methyltribromosilane, methylcyclohexyldichlorosilane, phenyltrichlorosilane and methylphenyldichlorosilane. Suitable disilylalkanes of Formula IV include, more particularly, α,ω-bis-(dichloromethylsilyl)ethane and α,ω-bis-(dichloromethylsilyl)butane.

The organohalogenopolysiloxanes which may be alkylated by the new process are organopolysiloxanes comprising one or more halogen atoms distributed in any manner on the silicon atoms. In this class of compounds, there may be mentioned more especially the α,ω-bis-(organohalogenosilyl)organopolysiloxanes of the formula:

$$R_b{}^2-SiX_{(3-b)}-O-\left[\begin{matrix}R^3\\|\\SiO\\|\\R^4\end{matrix}\right]_n-SiX_{(3-c)}-R_c{}^2 \qquad \text{V}$$

in which $R^2$, X, $b$ and $c$ are as previously defined, $R^3$ and $R^4$ have the same definition as $R^2$ and may be identical or different, and $n$ is an integer lower than 500. Examples of compounds of the Formula V are 1,7-dichlorooctamethyltetrasiloxane, 1,11-dichlorododecamethylhexasiloxane and the α,ω-dichloroorganopolysiloxane oils.

Halogenated tin derivatives which may be alkylated by the new process include, more especially, halogenostannanes of the formula:

$$R_a{}^2-Sn-X_{(4-a)} \qquad \text{VI}$$

in which $R^2$, X and $a$ have the same definition as before. Examples of such compounds are tin tetrachloride, methyltrichlorotin, dimethyldichlorotin, triethylchlorotin, dibutyldichlorotin, dioctyldichlorotin or diphenyldichlorotin.

The alkylated zinc derivatives employed in the invention are mixed or symmetrical derivatives of the formulae $R^5$—Zn—X or $R^5$—Zn—$R^5$ respectively, in which $R^5$ represents a branched or unbranched alkyl radical having from 1 to 12 carbon atoms and X is a halogen atom. Examples of such derivatives are methyl zinc chloride, butyl zinc chloride and bromide, diethyl zinc and dioctyl zinc.

In the process of the invention, the alkylation is carried out in the presence of a hexaalkylphosphoryltriamide or of an N,N-dialkylamide, employing a proportion of at least 1 molecule of amide per atom of zinc, preferably 1.5 to 5 molecules. A larger quantity of amide is not harmful to the reaction, but generally affords no further advantage. The temperature at which the reaction takes place is not critical; in general, it is between 10° C. and 120° C.

The alkylation may be partial or complete, i.e. either some or all of the halogen atoms present in the substance to be alkylated may be replaced. In the first case, it is preferable for the quantity or organozinc derivative employed to correspond to the stoichiometric quantity in relation to the partial reaction desired. In the second case, it is necessary to operate with a quantity of organozinc derivative at least equal to that corresponding to total alkylation. Since the theoretical quantity is generally sufficient, there is substantially no advantage in employing a considerable excess of alkylating agent.

The halogenoalkyl zinc and dialkyl zinc derivatives which may be employed in this process may be prepared by any known process. However, it is known that halogenoalkyl zinc derivatives are difficult to obtain by direct synthesis from zinc if an alkyl halide other than an iodide is employed. The reaction is then very lengthy and the yields, which are already pool with alkyl bromides containing more than 4 carbon atoms, become almost nil with the corresponding chlorides. Now, alkyl chlorides are in fact the only halogenated derivatives which can readily be industrially employed. The same difficulties are not encountered in obtaining symmetrical organozinc derivatives, since the latter are prepared by distillation of mixed organozinc derivatives; but their production is substantially limited to the distillation of alkylzinc iodides, especially when higher alkyl derivatives are desired.

The present invention also provides a process for the preparation of halogenoalkyl zinc derivatives, more particularly chloroalkyl zinc derivatives. In this new process, the halogenoalkyl zinc derivative is obtained by adding an alkyl halide to zinc in a hexaalkylphosphoryltriamide of Formula I, preferably hexamethylphospheryltriamide, the relative proportions of phosphorated amide and of zinc being identical to those hereinbefore defined for the alkylation reaction.

In practice, the preparation of the organozinc derivatives and their use in the alkylation of the halogenated silicon and tin derivatives in accordance with the invention preferably take place as indicated in the following.

Zinc, preferably in the form of a coarse powder having a grain size in the neighbourhood of 0.2 mm., the chosen hexaalkylphosphoryltriamide and iodine or an alkyl iodide are successively introduced into the reaction apparatus in proportions such that there is from about 0.005 to 0.05, preferably from 0.01 to 0.03, atom of iodine per atom of zinc in the reaction medium. The mixture is brought to a temperature, preferably between 20° C. and 100° C., and the alkyl halide is then added in an excess of about 20% to 50% by weight calculated on the zinc employed in the reaction. The mixed organozine derivative is obtained in very good yield, directly in solution in the phosphorated amide employed. The solutions thus obtained, which contain the organozinc derivative in the solvated state, are stable in ambient air.

This process is particularly advantageous as the presence of a hexaalkylphosphoryltriamide, which favours the formation of the organometallic derivative, makes it possible to use alkyl halides which have hitherto been regarded as sparingly reactive or completely inactive to zinc. Of the latter, there may be mentioned more particularly the alkyl chlorides of 1 to 12 carbon atoms, such as ethyl chloride, butyl chloride and octyl chloride.

It is also possible to synthesis the mixed organozine derivatives directly in an N,N-dialkylamide by applying the method described in French Pat. No. 1,236,115. However, this method is not very effective in the case of higher alkyl chlorides.

The crude reaction products obtained by either of these two methods may be employed in the process of the invention without further purification to alkylate halogenated silicon and tin derivatives, such as, for example, those of the Formulae III, IV, V and VI. For this purpose, it is sufficient to add one of these compounds to the aforesaid mixture, or vice versa, and to maintain the temperature between 10° C. and 120° C. with stirring, as hereinbefore stated. The substance which it is desired to alkylate may be added either alone or in association with a solvent which is not capable of producing parasitic side-reactions. Suitable solvents are the aliphatic, cycloaliphatic and benzene hydrocarbons, such as heptane, cyclohexane, benzene and toluene.

The alkylated organosilicon derivative may be separated by any known means, the simplest of which consists in separating the reaction mixture obtained by fractional distillation under normal or reduced pressure.

It is also possible to carry out the alkylation by forming the mixed organozinc derivative in situ. In this case, the zinc, the alkyl halide, the iodine or the alkyl iodide in a small quantity, the hexaalkylphosphoryltriamide or the N,N-dialkylamide and the derivative to be alkylated are directly reacted at the chosen temperature. The alkylated product may be isolated from the reaction mixture in the same way as in the preceding case.

Depending upon the alkyl halide, the substance to be alkylated and the amide employed, this second procedure may give rise to a more or less vigorous reaction. In some cases, notably in the case of organohalogenosilanes, it may be desirable to cool the reaction mixture or to dilute it with an inert diluent such as an aliphatic or aromatic hydrocarbon in order to control the reaction. For the same purpose, it is also possible to add the alkyl halide gradually to the mixture of the other reactants, which are heated at the appropriate temperature.

The akylation may also be effected with symmetrical organozinc derivatives. In this case, the best method is to prepare the mixed organozinc derivatives in a hexaalkylphosphoryltriamide as previously described and to distil a part of the reaction product under reduced pressure to obtain a distillate consisting of the symmetrical metallic derivative in solution in the phosphorated amide employed. The solutions obtained, which are stable in air and can be handled without danger of ignition, contain the symmetrical organozinc derivative in the solvated state. The solvation product consists of a stable complex which is distillable under reduced pressure without decomposition in the case of hexamethylphosphoryltriamide. This process is the more advantageous in that it makes it possible to obtain the symmetrical organozine derivatives directly from alkyl chloride and zinc, because as previously stated, it is possible to obtain the mixed derivatives in this way. The solutions thus obtained may be directly employed for the alkylation of the halogenated silicon and tin derivatives such as those of Formula III, IV, V and VI by the method previously indicated with reference to the separately prepared mixed organozinc derivatives.

The symmetrical organozinc derivatives may also be prepared by distilling the corresponding mixed derivatives in solution in N,N-dimethylformamide, as described in French Pat. No. 1,236,116. The solutions obtained are stable in the air and also contain the organometallic derivative in the solvated state.

It is also possible to prepare the mixed or symmetrical zinc derivatives by any other known method and to add thereto the sufficient quantity of an amide of the Formula I or II for carrying out the alkylation process of the invention.

The following examples illustrate the invention. In these examples hexamethylphosphoryltriamide is referred to as HMPT.

EXAMPLE I

Into a 3-litre round-bottomed glass flask containing a nitrogen atmosphere and provided with a mechanical stirrer, a dropping funnel, a reflux condenser and a gas admission tube, are introduced 262 g. of coarse zinc powder, 1580 g. of HMPT and 4 g. of methyl iodide. A current of methyl chloride is passed through this mixture, which is stirred and heated at 50° C., until the absorption ends (duration of the operation: 14 hours). Since the reaction is exothermic, the temperature rises to about 60–70° C., and is maintained at this level throughout the duration of the admission of the methyl chloride.

When this operation has been completed, the gas outlet is protected by connecting it to a condenser cooled by a mixture of acetone and solid carbon dioxide, and 268 g. of methylvinylidichlorosilane are added in one hour to the solution of methyl zinc chloride in HMPT, the temperature being maintained at 50° C. throughout the duration of the addition. The stirred mixture is then maintained at 50° C. for 4 hours.

The product of the reaction is then fractionated by distillation under atmospheric pressure, the distillation apparatus being connected to a condenser cooled by a mixture of acetone and solid carbon dioxide to recover the trimethylvinylsilane entrained by the excess of methyl chloride. The fraction containing the trimethylvinylsilane, which distils at 54.5° C., is collected. The contents of the condenser are degasified at 20° C. under atmospheric pressure to eliminate the methyl chloride, and the remainder is added to the preceding fraction. In this way, 135 g. of trimethylvinylsilane are collected.

EXAMPLE II

Into the apparatus described in Example I 1400 g. of HMPT, 262 g. of zinc, and 3 g. of iodine are introduced. The stirred mixture is heated to about 55° C., and 600 g. of octyl chloride are then added in 1 hour 30 minutes, whereafter the mixture is heated at 100° C. for 20 hours. The solution of octyl zinc chloride in HMPT thus obtained is cooled to 50° C. and 220 g. of trimethylchlorosilane are added in 1 hour. The mixture is heated at 70° C. for 4 hours and then distilled under atmospheric pressure. 100 g. of unreacted trimethylchlorosilane are collected at 57° C. The distillation is continued under an absolute pressure of 17 mm. Hg to obtain 190 g. of octyltrimethylsilane at 91° C. The extent of conversion of the zinc is 50%.

EXAMPLE III

Into a 2-litre round-bottomed flask situated in a nitrogen atmosphere and provided with a mechanical stirrer and a reflux condenser, ethyl bromide (223 g.), zinc (130 g.), trimethylchlorosilane (130 g.), HMPT (800 g.), iodine (2 g.), and benzene (100 cc.) are introduced. The temperature is first brought to 50° C. and then gradually to 70° C. in 10 hours. After the mixture has been cooled and distilled, 95 g. of trimethylethylsilane are collected under atmospheric pressure at a temperature of 62.5° C.

EXAMPLE IV

In this example, the partial alkylation of methylvinyldichlorosilane by dimethyl zinc in HMPT is effected.

(1) Preparation of dimethyl zinc in HMPT

Into a 3-litre, round-bottomed glass flask containing a nitrogen atmosphere and provided with a mechanical stirrer, a dropping funnel, a reflux condenser and a gas admission tube 1432 g. of HMPT, 260 g. of zinc and 5 cc. of methyl iodide are introduced. A current of methyl chloride is passed through this mixture, which is stirred and heated at 50° C., until the absorption ceases. The operation lasts 13 hours. The mixture thus obtained, which contains methyl zinc chloride in solution in HMPT, is distilled under reduced pressure (15 mm. Hg) up to a temperature of 200° C. in the mass. 125 cc. of HMPT are than added to the undistilled residue, and the distillation is completed under a reduced pressure of 3 mm. Hg up to 200° C. in the mass. In this way, 1154 g. of distillate consisting of HMPT and 169 g. of dimethyl zinc in solution are obtained. The dimethyl zinc is in the solvated state in the form of molecules of the formula $$(CH_3)_2Zn \cdot 2HMPT$$

(2) Alkylation of methylvinyldichlorosilane

Into a 2-litre round-bottomed flask containing a nitrogen atmosphere and provided with a mechanical stirrer, a dropping funnel and a thermometer, 282 g. of methylvinyldichlorosilane and 870 g. of xylene are introduced. The mixture is cooled to 0° C., and 462 g. of the previously obtained dimethyl zinc solution, i.e. the quantity necessary to introduce 46.4 g. of zinc into the reaction medium, are added at this temperature. The mixture is then distilled under atmospheric pressure and the distillation is stopped when the temperature of the vapours reaches 133° C. Analysis of the distillate by nuclear magnetic resonance and analysis of the chlorine content gives the following results:

|  | G. |
|---|---|
| Trimethylvinylsilane | 8.2 |
| Dimethylvinylchlorosilane | 144.4 |
| Recovered methylvinyldichlorosilane | 96.7 |

EXAMPLE V

Into a 1-litre, round-bottomed flask containing a nitrogen atmosphere and provided with a mechanical stirred, a reflux condenser and a dropping funnel, 257 g. of the dimethyl zinc solution in HMPT obtained in the preceding example, i.e. the quantity necessary to provide 25.8 g. of zinc, are introduced, 54 g. of methylvinyldichlorosilane are then added in 1 hour. Since the reaction is exothermic, the temperature rises from 25° C. to 54° C. When the addition is complete, 50 cc. of toluene are added and 36.2 g. of trimethylvinylsilane, B.P. 54.5° C., are then collected by distillation under atmospheric pressure.

EXAMPLE VI

In this example, the alkylation of dimethyldichlorosilane by diethyl zinc in HMPT is carried out.

(1) Preparation of diethyl zinc in HMPT

Into a 1-litre round-bottomed flask containing a nitrogen atmosphere and provided with a dropping funnel, a reflux condenser and a mechanical stirred, 65.4 g. of coarse zinc powder, 358 g. of HMPT and 2 g. of iodine are introduced. To this mixture, which is stirred and heated at 55° C., 140 g. of ethyl bromide are added in 1 hour. When the addition is complete, the mixture is heated for 5 hours at 90° C. The mixture obtained is then heated at 100° C. under reduced pressure (about 100 mm. Hg) to eliminate the unreacted ethyl bromide, and distilled under a reduced pressure of 0.5 mm. Hg, the distillation being stopped when the temperature of the vapours reaches 90° C.

From the distillate, which is fractionated under a reduced pressure of 0.2 mm. Hg, the following fractions may be collected:

at 60° C. HMPT 70 g.;
at 69° C. $(C_2H_5)_2Zn.2HMPT$ 154 g.
The extent of conversion of the zinc is 90%.

(2) Alkylation of dimethyldichlorosilane

Into a 500-cc. round-bottomed flask containing a nitrogen atmosphere and provided with a mechanical stirrer, a reflux condenser and a dropping funnel, 200 g. of $(C_2H_5)_2Zn.2HMPT$ prepared by the procedure described above and 100 g. of HMPT are introduced. The mixture is stirred and 38.7 g. of dimethyldichlorosilane are added in 35 minutes at ambient temperature. The temperature rises from 25° C. to 65° C. in the course of the addition, and, when this addition is complete, the mixture is heated at 90° C. for 4 hours. The reaction product is distilled under reduced pressure (120 mm. Hg) and the distillation is interrupted when the temperature of the vapours reaches 75° C. The distillate obtained has the following composition:

| | G. |
|---|---|
| Dimethyldiethylsilane | 30 |
| Dimethylethylchlorosilane | 2 |

EXAMPLE VII

Into a 500-cc. round-bottomed flask containing a nitrogen atmosphere and provided with a dropping funnel, a mechanical stirrer and a reflux condenser, 26 g. of coarse zinc powder, 144 g. of HMPT and 2 g. of iodine are introduced. The mixture is stirred and heated at 60° C., and 44 g. of butyl chloride are added in 15 minutes. The temperature is then maintained at 100° C. for 14 hours. The mixture thus obtained is rapidly distilled, first under a reduced pressure of 15 mm. Hg to eliminate the unreacted butyl chloride and then under 0.7 mm. Hg, the distillation being stopped when the temperature of the vapours reaches 117° C. The distillate containing the dibutyl zinc and HMPT is introduced into a 500-cc. round-bottomed flask and heated to 50° C., 54 g. of trimethylchlorosilane are then added and the reaction mixture is maintained under reflux for 6 hours. By distillation of this mixture, 22 g. of trimethylbutylsilane are collected at 115° C. under atmospheric pressure.

EXAMPLE VIII

Into a 1-litre round-bottomed flask containing a nitrogen atmosphere and provided with a mechanical stirrer, a reflux condenser and 2 dropping funnels are introduced 250 cc. of cyclohexane, which is refluxed. 250 cc. of a dimethyl zinc solution in HMPT containing 26.7 g. of Zn (obtained by a procedure identical to that described in Example IV) and 250 cc. of a cyclohexane solution containing 116 g. of phenyltrichlorosilane are then simultaneously added at the same rate. The addition last 1 hour 15 minutes, and the mixture is then maintained under reflux for 1 hour. After elimination of the cyclohexane by distillation under atmospheric pressure, the mixture is distilled under reduced pressure (20 mm. Hg). A distillate is thus collected between 85° C. and 125° C. having the composition:

| | G. |
|---|---|
| Phenyltrimethylsilane | 1.3 |
| Phenyldimethylchlorosilane | 42.5 |
| Phenylmethyldichlorosilane | 37.6 |
| Phenyltrichlorosilane | 2.6 |
| HMPT | 46 |

EXAMPLE IX

Into a 2-litre round-bottomed flask containing a nitrogen atmosphere and provided with a mechanical stirrer, a dropping funnel and a reflux condenser 463 g. of a solution of dimethyl zinc in HMPT containing 38.4 g. of zinc (obtained as described in Example IV) are introduced. The mixture is stirred, and a mixture containing 290 cc. of cyclohexane and 200 g. of 1,7-α,ω-dichlorooctamethyltetrasiloxane is added with stirring at ambient temperature. After addition, the mixture is heated at 80° C. for 5 hours. By distillation under reduced pressure (20 mm. Hg), 135 g. of decamethyltetrasiloxane are collected at 88.5° C.

EXAMPLE X

Into a 1-liter round-bottomed flask containing a nitrogen atmosphere and provided with a mechanical stirrer, a dropping funnel and a reflux condenser, 197 g. of $(C_2H_5)_2Zn \cdot 2HMPT$ (prepared as in Example VI) and 120 g. of HMPT are introduced. The mixture is stirred and 74 g. of diethyldichlorostannane in solution in 400 cc. of benzene are added with stirring. The temperature is maintained at 70° C. throughout the duration of the addition. When the addition is complete, the mixture is heated at 90° C. for 5 hours. The benzene is then eliminated by distillation under atmospheric pressure, and 60 g. of distillate containing 95% by weight of tetraethyl tin are finally collected at 75–78° C. under an absolute pressure of 23 mm. Hg.

EXAMPLE XI

Into a 1-litre flask containing a nitrogen atmosphere and provided with a mechanical stirrer, a reflux condenser and a dropping funnel are introduced 300 cc. of cyclohexane and 242 g. of β-cyanoethyltrichlorosilane. The stirred mixture is heated to a temperature between 25° C. and 50° C., and 228 g. of a solution of dimethyl zinc in HMPT containing 23.5 g. of zinc (obtained by a procedure identical to that described in Example IV) is added in 2 hours 40 minutes. The mixture is then heated at 50–55° C. for 2 hours 15 minutes and filtered. The precipitate is extracted with cyclohexane and benzene for 1 hour at 65° C. and again filtered. The filtrates are distilled and a distillate containing:

| | G. |
|---|---|
| β-Cyanoethylmethyldichlorosilane | 38.5 |
| β-Cyanoethyldimethylchlorosilane | 28 |
| β-Cyanoethyltrimethylsilane | 0.8 | is collected between 70.5° C. and 91.5° C. under a pressure of 5 mm. Hg.

EXAMPLE XII

Into a 1-litre round-bottomed flask containing a nitrogen atmosphere and provided with a mechanical stirrer, a reflux condenser and a dropping funnel, 626 g. of a solution of dimethyl zinc in N,N-dimethylformamide containing 71.9 g. of zinc (obtained by distillation of methyl zinc chloride prepared in dimethylformamide by the procedure described in Example III of French Pat. No. 1,236,115) are introduced. The stirred solution is heated to 50° C. and 132 g. of methylvinyldichlorosilane are added in 1 hour 15 minutes, the temperature being maintained at 50° C. When the addition is complete, the mixture is heated at 55° C. for 4 hours. The mixture is fractionally distilled under atmospheric pressure and 51 g. of trimethylvinylsilane are obtained at 54.5° C.

EXAMPLE XIII

Into a 1-litre round-bottomed flask containing a nitrogen atmosphere and provided with a mechanical stirrer, a reflux condenser and adropping funnel, 318 g. of a solution of dimethyl zinc in HMPT containing 32.75 g. of zinc are introduced. To the stirred solution of dimethyl zinc, a mixture containing 140 g. of diphenyldichlorotin and 200 cc. of petroleum ether is added in 2 hours at ambient temperature. The mixture is then heated at 55° C. for 4 hours and cooled at ambient temperature. The zinc chloride which has precipitated is filtered off, 5 cc. of water are added to the filtrate and the mixture is filtered again and then distilled under atmospheric pressure to eliminate the petroleum ether. By fractional distillation under a reduced pressure of 0.7 mm. Hg, a distillate having the following composition:

| | G. |
|---|---|
| Dimethyldiphenyl tin | 90 |
| Methyldiphenylchlorotin | 30 | is collected between 115° and 130° C.

EXAMPLE XIV

Into a 3-litre, round-bottomed flask containing a nitrogen atmosphere and provided with a mechanical stirrer, a reflux condenser and a dropping funnel, 750 cc. of cyclohexane and 871.5 g. of diphenylchlorobutoxysilane of a purity of 93.9% are introduced. To this stirred solution, 1165 g. of a solution of dimethyl zinc in HMPT containing 98.4 g. of zinc are added in 1 hour 10 minutes, and the mixture is then refluxed for 3 hours.

The reaction product is first distilled under atmospheric pressure to eliminate the cyclohexane and then under a reduced pressure of about 1 mm. Hg to separate the $ZnCl_2 \cdot HMPT$ complex formed in the course of the operation. On fractional distillation of the distillate, 615 g. of diphenylmethylbutoxysilane are obtained at 132° C. under 1.2 mm. Hg.

We claim:
1. In a process for the alkylation of a silicon or tin derivative having at least one silicon-halogen or tin-halogen bond respectively, by treating the said derivative with a mixed or symmetrical alkyl zinc derivative, the improvement which comprises carrying out the alkylation in an amide of the formula:

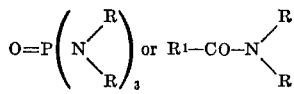

in which R and $R^1$ are lower alkyl radicals, and $R^1$ may also be hydrogen.

2. Process according to claim 1, wherein the alkyl zinc derivative has been prepared in situ by reacting zinc with an alkyl halide in the presence of iodine or with an alkyl iodide in a reaction medium comprising an amide of the formula:

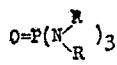

in which R is lower alkyl.

3. Process according to claim 1, wherein the amide is hexamethylphosphoryltriamide.

4. Process according to claim 1, wherein the amide is N,N-dimethylformamide.

5. Process according to claim 1, wherein the said silicon or tin derivative is a halogenosilane, organohalogenopolysiloxane, or a halogenostannane.

6. Process according to claim 5, wherein the said silicon or tin derivative is of the formula:

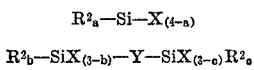

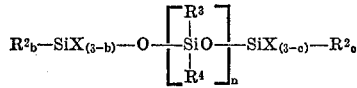

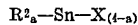

or $$R^2{}_a\text{—Sn—}X_{(4-a)}$$

where $R^2$, $R^3$ and $R^4$ are the same or different and are each a branched or unbranched alkyl radical, an alkenyl radical, an alkoxy radical, a cycloalkyl radical optionally having an alkyl chain, an aryl radical optionally substituted by alkyl, or an aralkyl radical, X represents a halogen atom Y represents an alkylene radical, $a$ is 0, 1, 2 or 3, $b$ and $c$ are each 0, 1 or 2, and $n$ is an integer lower than 500.

7. Process according to claim 1, wherein the alkyl zinc derivative is of the formula:

$$R^5\text{—Zn—}X \text{ or } R^5\text{—Zn—}R^5$$

in which $R^5$ represents a branched or unbranched alkyl radical of 1 to 12 carbon atoms and X is a halogen atom.

8. Process according to claim 1, wherein 1 to 5 molecules of the said amide are used per atom of zinc.

9. A process of preparing tri-substituted organotin halides having the general formula $R_aR_b{'}SnX$ wherein R is selected from the group consisting of alkyl and aryl and $R'$ is alkyl, X is a halogen, each of $a$ and $b$ is an integer 1–2, and the total of $a$ and $b$ is 3, which comprises reacting in the presence of dimethylformamide an organotin halide of the general formula $R_aSnX_{4-a}$ wherein R, X, and $a$ have the meanings given above, a compound of the general formula $R'X$ wherein $R'$ and X have the meanings given above, and zinc.

10. A process as claimed in claim 9 wherein R is selected from the group consisting of methyl, propyl, butyl and phenyl, $R'$ is selected from the group consisting of methyl, ethyl and butyl and X is selected from the group consisting of iodine, bromine and chlorine.

References Cited
UNITED STATES PATENTS

| | | | |
|---|---|---|---|
| 3,398,117 | 8/1968 | Baronnier et al. | 260—448.2 X |
| 3,414,595 | 12/1968 | Oakes | 260—429.7 |
| 3,461,146 | 8/1969 | Turner et al. | 260—448.2 X |
| 3,475,472 | 10/1969 | Suzuki et al. | 260—429.7 |

TOBIAS L. LEVOW, Primary Examiner

W. F. W. BELLAMY, Assistant Examiner

U.S. Cl. X.R.

260—448.2 E